United States Patent [19]

Flood

[11] Patent Number: 5,137,306

[45] Date of Patent: Aug. 11, 1992

[54] MULTIPLE-DUCT CONDUIT SYSTEM WITH EXPANSION CHAMBER COUPLING

[75] Inventor: Timothy E. Flood, Kennesaw, Ga.

[73] Assignee: The George-Ingraham Corp., Stone Mountain, Ga.

[21] Appl. No.: 484,864

[22] Filed: Feb. 26, 1990

[51] Int. Cl.⁵ .............................................. F16L 39/04
[52] U.S. Cl. .................................. 285/137.1; 285/187; 285/369; 285/383; 285/294; 285/915
[58] Field of Search .................... 285/137.1, 331, 345, 285/369, 383, 371, 187, 294, 915

[56] References Cited

U.S. PATENT DOCUMENTS

| | | | |
|---|---|---|---|
| 293,752 | 2/1884 | Krahenbeihl et al. | |
| 528,291 | 10/1984 | Cummings | 285/137.1 X |
| 680,151 | 8/1901 | Haltman | 285/369 X |
| 1,518,705 | 12/1924 | Raun | |
| 2,312,587 | 3/1943 | Price | 25/128 |
| 2,382,966 | 8/1945 | Arens | 74/501 |
| 2,934,466 | 4/1960 | Molla | 154/83 |
| 3,042,427 | 7/1962 | Word | 285/137.1 |
| 3,125,361 | 3/1964 | Weaver | 285/137.1 |
| 3,161,210 | 6/1961 | Loof | 138/128 |
| 3,240,233 | 3/1966 | Johnston | 138/108 |
| 3,363,879 | 1/1968 | Irik | 254/134.3 |
| 3,590,855 | 7/1971 | Woollen | 285/137.1 X |
| 3,657,942 | 4/1972 | Sullivan | 74/501 |
| 3,747,632 | 7/1973 | Kok et al. | 285/137.1 X |
| 3,974,862 | 8/1976 | Fuhrmann | 138/37 |
| 4,016,356 | 4/1977 | McLoughlin | 174/35 |
| 4,084,842 | 4/1978 | Stonitsch | 285/187 X |
| 4,101,114 | 7/1978 | Martin et al. | 254/134.3 |
| 4,221,405 | 9/1980 | Stonitsch | 285/187 X |
| 4,331,322 | 5/1982 | Woodruff | 254/134.3 |
| 4,337,922 | 7/1982 | Streiff et al. | 254/134.3 |
| 4,411,409 | 10/1983 | Smith | 254/134.3 |
| 4,412,673 | 11/1983 | Ramsden et al. | 254/134.3 |
| 4,565,351 | 1/1986 | Conti et al. | 254/134.3 |
| 4,729,215 | 6/1988 | Martin | 285/187 |
| 4,834,825 | 5/1989 | Adams et al. | 150/294 |

FOREIGN PATENT DOCUMENTS 2845926  4/1980  Fed. Rep. of Germany ... 285/137.1

Primary Examiner—Dave W. Arola
Attorney, Agent, or Firm—Hopkins & Thomas

[57] ABSTRACT

A multiple duct conduit system (10) includes conduit sections with elongated outer ducts (18) and inner ducts (19) are disposed therewithin and the conduit sections are connected in end-to-end relationship for carrying fiber optic cables and the like. The inner ducts (19) are formed of a material having a coefficient of thermal expansion which is different from that of the outer ducts and the inner ducts expand and contract with respect to the outer ducts as temperatures change. Couplings (16) connect the ends of the conduit sections and define passageways (31-34) constructed with expansion chambers (48) to accommodate changes in the lengths of the inner ducts (19) with respect to the outer ducts (18).

13 Claims, 1 Drawing Sheet

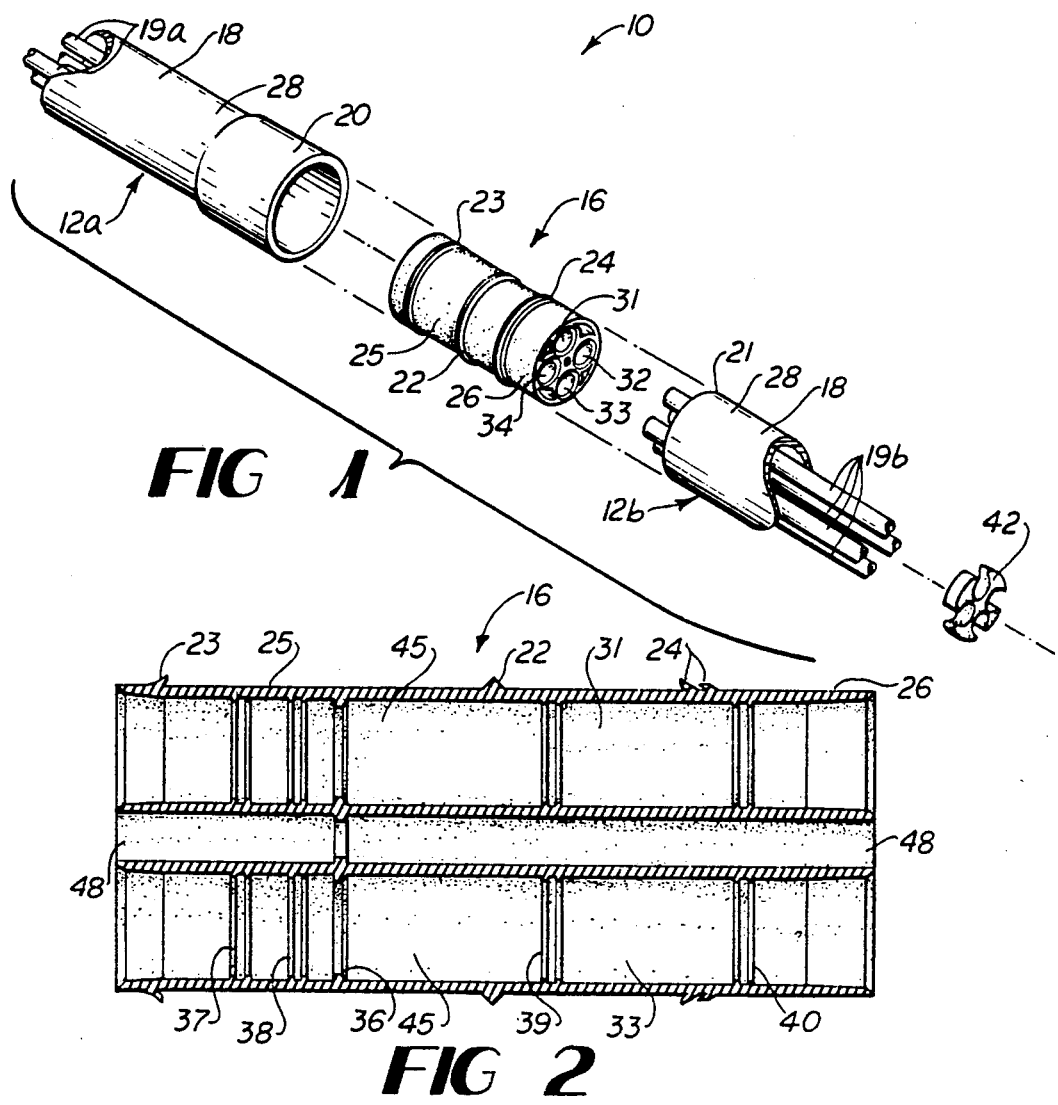
FIG 1
FIG 2
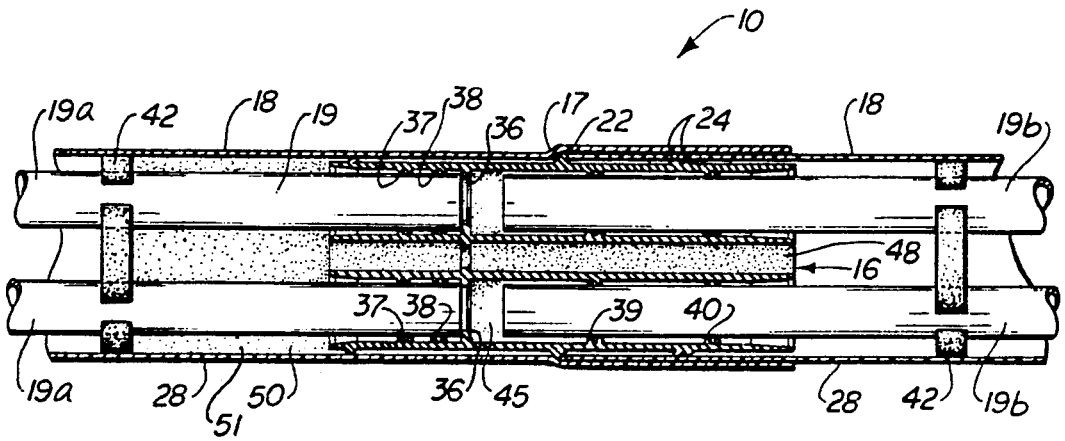
FIG 3

MULTIPLE-DUCT CONDUIT SYSTEM WITH EXPANSION CHAMBER COUPLING

FIELD OF THE INVENTION

The invention disclosed herein relates to multiple duct conduit systems of the type used for underground fiber optic cables or the like. More particularly, the invention relates to a segmented multiple duct conduit system having its conduit sections assembled end-to-end, with a coupling positioned between each section and sealing the adjacent ends of the outer ducts together and sealing the adjacent ends of the inner ducts together.

BACKGROUND OF THE INVENTION

Voice and data transmission cables, such as fiber optic cables and the like are commonly installed within multiple-duct conduit systems which can be laid underground, underwater, or in other locations. Such systems typically are formed in sections laid end-to-end and include an outer duct which houses a plurality of inner ducts in parallel relationship to one another. The duct sections usually are of a defined length, for example, twenty feet long, and are attached in end-to-end relationship. This facilitates installation and maintenance in many cases, such as where the conduit system is installed underground, below roadways or in other confined areas. Typically access to the conduit system is through manholes in the street or ground.

After the multiple duct system has been installed, the fiber optic cables, etc. are installed in the duct system by propelling a carrier attached to an end of a pulling tape through the individual inner ducts, by applying compressed air behind the carrier. When the pulling tape has been drawn by the carrier into one of the inner ducts from one manhole to another, the fiber optic cable is attached to one end of the pulling tape and the cable is drawn by the pulling tape into the inner duct.

When the carriers are propelled through the inner ducts of the conduit system it is important that the inner surfaces of the inner ducts and the joints at the ends of each inner duct of the duct system permit smooth and efficient passage of the carrier so that the carrier can be propelled long distances. This permits the duct system to be constructed with longer distances between its manholes. The smooth and efficient passage of the carrier through the inner ducts is partially dependent on an effective air seal being formed at each joint of the inner ducts and on a relatively smooth side wall of the inner ducts. Also, seals at the ends of the inner and outer ducts protect the duct system from the seepage of water into the duct system so as to avoid contact of moisture with the cables and to avoid the freezing and thawing of water in the ducts.

In some installations, and particularly where the conduit system is to be buried underground and a trench or ditch is dug in the ground to receive the conduit system, rough handling of the conduit system is required to properly install the system. Rough handling of the conduit system is common and occasionally results in loose or faulty connections at the juncture of adjacent conduit sections. Failures at these points can allow water leakage, which can result in corrosion and freezing/thawing problems, and can even result in breakage of one or more cables or wires which is difficult to locate and repair.

In addition, thermal expansion and contraction of the outer and inner ducts can have a detrimental effect on the couplings. For example, when the conduit sections have been assembled, the temperature of the outer duct might change more rapidly than the temperature of the inner ducts, causing expansion or contraction of the outer duct with respect to the inner ducts. Moreover, if the inner ducts are fabricated from a material that is different from the material of the outer ducts, the coefficients of expansion likely will be different for the inner and outer ducts, so that the inner ducts might be relatively longer with respect to the outer ducts at one temperature and relatively shorter with respect to the outer ducts at another temperature. If the multiple duct system is being assembled in hot or cold weather and placed in the ground which could have a temperature difference as much as 30° F. from atmospheric temperature, the temperature of the conduit sections will change after the conduit sections have been placed in the ground and the relative lengths of the inner ducts to the outer ducts will change after the conduit system has been installed. This tends to cause the inner ducts to withdraw from or to protrude further inwardly into the joints formed between the sections of the multiple duct conduit assembly, which can cause an ineffective seal in the joint, or cause damage to the seals of the joints, open joints resulting in leaks in the seals of the joints, cracked joints, etc.

While attempts have been made to solve problems relating to the connections and seals of multiple duct conduit systems, there exists a need in the art for a multiple duct conduit system that includes inner ducts that have inner wall surfaces that offer minimal resistance to the movement of a carrier and to the movement of a fiber optic cable or the like when moved through the ducts, which secures both inner ducts and outer ducts and accommodates movements in the joints of adjacent conduit sections during handling of the conduit sections while still maintaining a good seal at the ends of the conduit sections, a coupling which permits expansion and contraction of the inner ducts with respect to the outer ducts without losing the seals at the joints, which seals the joints of the sections against water, and which is extremely resistent to separation once installed.

SUMMARY OF THE INVENTION

Briefly described, the present invention relates to a multiple duct conduit system for receiving fiber optic cable and the like in an underground environment or the like, wherein the system is formed of a series of conduit sections placed end-to-end, with each section comprising an outer duct with a main body portion and an enlarged end portion or "bell" at one end, and a plurality of inner ducts extending along the length of the main body portion of each outer duct and protruding from the other end of the outer duct. More particularly the invention includes a coupling for multiple duct conduit sections that is normally inserted into the enlarged or "bell" end portion of the outer duct of the conduit system. The coupling defines a plurality of passageways which telescopically receive adjacent ends of the inner ducts of the abutting sections of the conduit system. An outwardly protruding flange is formed on the outer circumferential surface of the coupling intermediate the ends of the coupling for engagement with the end portions of the adjacent outer ducts, so that the coupling is positively clamped between the adjacent outer ducts in a predetermined position. The length of the coupling, the position of the flange on the coupling, and the length of the enlarged end of the outer duct are proportioned so that a face of the coupling is generally flush with the open end of the enlarged end portion of the outer duct. At the other ends of each conduit section the inner ducts protrude from the outer duct so that they can be visually guided into the passageways of the coupling when the conduit sections are being connected together. Additional outwardly extending seals can be provided about opposite end portions of the coupling for sealing between the coupling and the inner surfaces of the abutting sections of the conduit system.

The cylindrical walls of the passageways of the coupling that telescopically receive the inner ducts also include seal rings that engage and seal against the inner ducts. An expansion chamber is formed in each passageway of the coupling inwardly of the seal rings so that should the inner ducts change in length with respect to their outer duct, the ends of the inner ducts which project into the coupling of the adjacent conduit section can move further into or partially withdraw through the coupling without disturbing its seal. Thus, the coupling is constructed to accommodate expansion and/or contraction of the ducts. The coupling is formed from suitable elastomeric material or from a combination of suitable elastomers. The invention is shown to include a four-way coupling for receiving four inner ducts; however, this is by way of example only and is not meant to be a limiting factor.

It is therefore an object of the invention to provide a sectional multiple duct conduit system which permits long lengths of the system to extend between manholes and which provides adequate protection for the fiber optic cables and the like which are installed in the duct system.

Another object of the invention to provide an elongated coupling for multiple duct conduits that effectively seals both the inner and outer ducts of the conduit system against ingress of water and which is effective in securing adjacent conduit sections together at their points of connection.

Another object of the present invention is to provide a coupling which is easily assembled with the inner and outer ducts of a sectional multiple duct conduit system and which is easily connected to an adjacent conduit section at the job site and which is able to accommodate expansion and contraction of the ducts themselves.

A further object of the present invention is to provide a coupling which is easily and inexpensively produced and which is durable to provide a long service life.

Another object of the invention is to provide a multiple duct conduit system which is inexpensive to manufacture and transport to the job site, which is easy to install and which can be expediently filled with fiber optic cable or the like and which adequately protects the cable from liquid leakage.

Various other objects, features and advantages of the present invention will become apparent from the following description, with reference to the accompanying drawings.

BRIEF DESCRIPTION OF THE DRAWINGS

FIG. 1 is a partial, exploded perspective view of a joint of the multiple duct conduit system, showing the adjacent ends of adjacent conduit sections and a coupling positioned between the conduit sections.

FIG. 2 is a cross-sectional view of the coupling taken along the longitudinal axis of the coupling.

FIG. 3 is a cross-sectional view of a joint of the multiple duct conduit system in its assembled relationship.

DETAILED DESCRIPTION OF THE PREFERRED EMBODIMENT

Referring now in more detail to the drawings, in which like numerals indicate like parts throughout the several views, FIGS. 1 and 3 illustrate a multiple duct conduit system 10, wherein adjacent ends of duplicate conduit sections 12a and 12b are placed in adjacent, abutting relationship, with a coupling 16 positioned at the adjacent ends for connecting the sections together.

The conduit sections 12a and 12b each comprise an outer duct or conduit 18 and a plurality of duplicate inner ducts or conduits 19a and 19b. Typically, the conduit sections will each have three or four inner ducts; however, the conduit systems can have more or fewer inner ducts, depending on the needs of the user.

One end of each outer duct 18 will include an enlarged end portion or "bell" 20, with the enlarged end being substantially cylindrical and of an interior diameter sufficient to telescopically receive the other or "male" end of the main body portion 28 of the adjacent outer duct. The enlarged end portion 20 is permanently connected to the main body portion of the outer duct by an annular shoulder 17.

As will be explained in more detail hereinafter, the inner ducts 19 are of a length so that the ends thereof protrude from the distal or male end 21 of the outer duct.

The outer curved surface of each coupling 16 is approximately cylindrical, and an annular protrusion or flange 22 extends about the outer surface of each coupling at one-half the length of the coupling. Additional annular seal rings 23 and 24 are formed on the outer cylindrical surface of the coupling 16, with the seal ring 23 being formed on one end portion 25 and the seal rings 24 being formed on the other end portion 26 of the coupling.

As illustrated in FIG. 3, when the coupling 16 is inserted in the enlarged end 20 of an outer duct 18, the end portions 25 and 26 are of a diameter that substantially fills the inside diameter of the main body portions 28 of the adjacent outer ducts 18, and the annular flange 22 abuts the inwardly extending shoulder 17 that connects the enlarged end 20 to the main body portion of the outer duct 18. Further, the coupling 16 is of a length such that its end portion 26 terminates at a position which is substantially coextensive with the end face of the enlarged end 20 of the outer duct 18.

Passageways 31, 32, 33 and 34 are formed through coupling 16, with the passageways being uniformly spaced about the coupling and extending longitudinally through the coupling. Each passageway 31–34 includes an internally protruding annular flange 36 and a plurality of inwardly protruding annular seals 37, 38, 39 and 40. The annular flange 36 of each passageway 31–34 is offset longitudinally from the outwardly extending annular flange 22 that surrounds the outer cylindrical body of the coupling 16.

As shown in FIG. 3, the coupling is sized and shaped so as to telescopically receive in its passageways 31–34 the ends of inner ducts 19. The internally protruding annular flanges 36 function as a stop for each of the inner ducts 19a. Further, the annular seals 37 and 38 surround and engage the portions of the inner ducts 19a that extend into the coupling 16 so as to form a fluid-tight seal with the outer surface of the inner ducts 19a.

The other inner ducts 19b which protrude from the distal end 21 of the adjacent outer duct 18 are telescopically received in the other ends of the passageways 31-34 of the coupling on the other side of the internally protruding annular flange 36. The protruding ends of the inner ducts 19b typically will not engage the annular flanges 36, as will be described in more detail hereinafter.

Spacers 42 are placed about the inner ducts of each conduit section so as to hold the inner ducts in parallel, stable positions within the outer ducts 18.

When the conduit sections 12 of the multiple duct conduit system 10 are to be assembled, typically the inner ducts 19a are pushed into the passageways 31-34 of end portion 25 of a coupling 16 until the end of each inner duct engages the internally protruding annular flange 36 of its passageway. The end portions of the inner ducts 19a will pass beyond annular seals 38 and 39 of the passageways, so that a fluid-tight seal is made between the coupling 16 and the outer surface of each inner duct. Several of the spacers 42 are then placed along the lengths of the inner ducts 19 so as to maintain the inner ducts in a bundle of parallel, spaced inner ducts with an outside breadth which is less than the internal diameter of the main body portion of the outer ducts 18.

After the inner ducts 19b have been assembled to the couplings 16 and spacers 42, the bundle of inner ducts is inserted into the outer duct 18, with the coupling 16 following the inner ducts into the enlarged end portion 20 of the outer duct. Exterior annular flange 22 is sized and shaped to seat against the main body portion of the outer duct. When the coupling 16 is telescopically moved into the enlarged end 20 of its outer duct 18, the outwardly extending annular flange 22 of the coupling engages and seats against the annular shoulder 17. This stops any further movement of the inner ducts 19 and coupling 16 into the outer duct 18, and tends to form a seal between the outer surface of the coupling 16 and the inner surface of the inner duct 18. This locates the outwardly facing end of the coupling substantially coextensive with the peripheral edge of the bell of the outer duct.

When the coupling 16 has been properly inserted in the enlarged end 20 of an outer duct 18 so that its annular flange 22 seats against the shoulder 17 of the outer duct, the inner ducts 19 extend on through the outer duct 18 and protrude from the distal end of the outer duct.

After each conduit section has been assembled as described above, each section can now be assembled in end-to-end relationship with an adjacent conduit section and the conduit sections are located onto a truck or other carrier and are transported to the job site. when being assembled end-to-end, the protruding end portions of the inner ducts 19 and the outwardly facing end of the coupling 16 are both visible to the workers and the protruding ends of the inner ducts are visibly aligned with the passageways 31-34 of the coupling 16 of an adjacent conduit section, and then the sections are moved together, so that the male end portion of each conduit section is plugged into the enlarged end of the adjacent conduit section.

As the end portions of the inner ducts 19b are telescopically received in the passageways 31-34 of the coupling 16, the end portion of the outer duct 18 is guided into the confines of the enlarged end 20 of the adjacent outer duct 18. Therefore, the telescopic movement of the inner ducts into the coupling 16 functions as a guide means for guiding the male end of the outer duct into the enlarged end 20 of an adjacent outer duct. The exterior annular flange 22 is of a diameter approximately equal to the outside diameter of the main body portion of the outer duct 18. Therefore as the plugging movement continues, the male end of the outer duct is telescopically received in the enlarged end 20 of the adjacent outer duct until the end of the outer duct abuts the annular flange 22 of the coupling 16. This results in the flange 22 being held in the space between the ends of the main body portions of adjacent outer ducts, with the coupling never moving too far into either of the ducts. Further, the seal rings 23 and 24 at the exterior surfaces of the end portions of the coupling 16 form fluid seals between the interior surfaces of the outer ducts 18 and the coupling 16.

Because the coupling always extends far into the adjacent ends of the main body portions of adjacent outer ducts and because the outer surface of the coupling is cylindrical, the seals 23, 24 always will engage the inside surfaces of the outer ducts, and if there should be expansion or contraction of the outer ducts the spacing of the seals 24 from annular flange 22 will assure that the longitudinal movements of the outer ducts with respect to one another will not result in the opening of a seal.

As the ends 19b of the inner ducts telescopically move into the passageways 31 of the coupling 16, the ends of inner ducts pass the seals 39 and 40 so that a fluid seal is formed about the exterior surface of each inner duct with respect to the coupling 16.

Once the conduit sections have been connected in end-to-end relationship as described and are placed in an underground environment, the fiber optic cable is drawn into each inner duct 19. Typically, a carrier is attached to a pulling tape and the carrier is propelled by compressed air through each of the inner ducts so that its pulling tape trails behind and extends from one manhole to the next. One end of the pulling tape is connected to the fiber optic cable and the cable is drawn into the inner duct by pulling with the pulling tape.

In order that the manholes be placed as far apart as possible, the inner ducts 19 are fabricated of a material that has low surface friction and which permits the carrier to be propelled long distances and permits the fiber optic cables to be pulled long distances without excessive surface friction between the carrier and the inner duct or between the fiber optic cable and inner duct. For this purpose, the inner ducts 19 are fabricated of polyethylene. The coupling 16 typically is formed of polyurea. The outer duct is formed of polyvinylchloride which forms a hard exterior shell that is not so brittle as to rupture during installation and use of the conduit system. PVC is a relatively inexpensive material that is easy to form in conduit sections of twenty feet or other typical lengths used in the industry. Moreover, the PVC and polyethylene can be cut to length in the field, as when a short length of conduit section is required.

The polyethylene inner ducts 19, while being relatively expensive to produce, provide a low friction surface, for the reasons described. The coupling 16 made of polyurea or other elastomeric flexible material that is waterproof permits a slight bending and twisting between the conduit sections as the conduit system is being installed. For example, it is common practice to assemble the conduit sections in end-to-end relationship as previously described adjacent a culvert and then after assembly, move the assembled duct system laterally and downwardly into the culvert. This causes the assembled conduit system to flex somewhat at its joints, and the elastomeric material of the coupling 16 and the cylindrical outer shape of the coupling permit bending and twisting forces to be applied to the outer and inner ducts without hazard of cracking, etc.

Since the inner ducts 19 are formed of a material different from the outer ducts 18, the coefficient of thermal expansion of the inner ducts is different from the coefficient of thermal expansion of the outer ducts. For example, the coefficient of linear thermal expansion for polyethylene is $1.25 \times 10^{-4}$ inch per inch per degree Fahrenheit, whereas the coefficient of linear thermal expansion for PVC is $2.95 \times 10^{-5}$ in/in/° F. Therefore, when the temperature of the inner ducts and outer ducts change, the inner ducts will move longitudinally with respect to the outer ducts. Typically, the inner ducts are firmly mounted in the end portion 25 of each coupling 16 with the distal ends of the inner ducts being loosely supported along the rest of their lengths in the outer duct, with the coupling 16 being firmly mounted between adjacent ends of adjacent outer ducts 18. Therefore, the distal ends of the inner ducts 19b tend to slide telescopically inside coupling 16 when the temperature changes.

Typically, the conduit sections are formed in twenty foot lengths, measuring from the shoulder 17 to the distal end of each outer duct. The lengths of the inner ducts 19 are chosen so that the inner ducts protrude from the outer ducts at the male end of the conduit sections. Typically, the inner ducts are cut to a length so that they will protrude from the male end of the outer ducts a length of one inch at 55° F. Thus, if the conduit system is being installed in hot weather so that the sections become warmer than 55°, the inner ducts will grow with respect to the outer ducts at the rate of one-quarter inch per 10° F. per twenty feet section. For example, if the conduits sections are being installed at 95° F., the inner ducts will protrude beyond the distal ends of the outer ducts an additional one inch. On the other hand, if the conduit sections are being installed at an atmospheric temperature of 35° F., the inner ducts will protrude from the distal ends of their outer duct a distance of only one-half inch.

Once the conduit sections have been assembled and are placed in a trench, etc. and are covered over with earth, etc., the conduit sections will gradually assume the temperature of their environment, usually about 55° F. If the sections were installed in a hot climate, the inner ducts will tend to shrink with respect to the outer ducts, or if the conduit sections were installed in a cold climate, the inner ducts will lengthen with respect to the outer ducts.

As illustrated in FIGS. 2 and 3, each passageway 31-34 of coupling 16 includes an expansion chamber 45 formed between the internally protruding annular flange 36 and the innermost seal 39. The innermost seals 39 are located to the right side (FIGS. 2 and 3) of the externally protruding annular flange 22 of the coupling. Therefore, as shown in FIG. 3, when the male end of the outer coupling 18 is thrust into the enlarged end 20 of the adjacent outer coupling and its end surface engages the externally protruding annular flange 22 of the coupling 16, and since the inner ducts 19 have been cut to a length that always causes them to protrude from the male end of the outer duct 18, the inner ducts will always protrude inwardly into the coupling 16 beyond the innermost seals 39 into their respective expansion chambers 45. Further, the internally protruding annular flanges 36 of each passageway 31-34 are located far to the left of the externally extending annular flange 22, a distance of at least two inches beyond the annular flange 22. This causes expansion chambers 45 to be of sufficient length to accept the end portions of the inner ducts 19 of a conduit section so that the end portions will always be placed between the innermost seal 39 and the internally protruding annular flange 26. The seal 39 forms a sliding fit about the exterior surface of its inner duct 19.

The expansion chambers 45 compensate for changes in length of the inner ducts 19 with respect to their outer ducts 18, so that when the conduit sections 12 are assembled together in hot or cold temperature and then are later installed in the ground and covered over so that they reach an intermediate ground temperature, the inner ducts will be permitted to expand or contract with respect to the outer ducts without causing any damage to the conduit system.

The couplings 16 are illustrated as including a central passageway 48 extending therethrough. This passageway is optional. If the coupling is formed without the passageway, the coupling performs as a seal between adjacent outer ducts. However, if the coupling is formed with the open ended central passageway 48 as shown, the central passageway can be utilized to inject polyurethane foam 51 into the outer duct 18 and between adjacent inner ducts 19 adjacent the enlarged end portion of the outer duct. The polyurethane foam 51 expands and fills the chamber 50 formed between the coupling 16 and its next adjacent spacer 42. The foam functions as an adhesive so as to more positively bond the surfaces of the coupling 16, inner ducts 19, outer duct 18 and spacer 42 that face the chamber 50. This tends to permanently connect the inner ducts with respect to their outer duct so that the effects of relative expansion and contraction of the inner ducts with respect to their outer duct will cause the changes in relative length to be emphasized at the distal or male end of each conduit section.

While the inner ducts and outer ducts and coupling have been described as comprising specified materials, it will be understood by those skilled in the art that variations in the materials that form the ducts and coupling can be made without departing from the spirit and scope of the invention. The exact placement of the seals and flanges of the coupling can be varied; however, the expansion chambers 45 each should be of a length sufficient to receive the protruding ends of the inner ducts 19b without having the inner ducts shrink with respect to the outer duct a length so as to withdraw from the seals 39 or expand with respect to the outer ducts so as to engage the internally protruding annular flanges 36 over a temperature range of about 40° F. higher or lower than ground temperature of about 55° F. While the inner ducts have been disclosed as being formed of a material having a coefficient of thermal expansion greater than that of the outer duct, it is within the scope of this invention that the outer duct could have a coefficient of thermal expansion greater than the inner ducts and the expansion chambers of the couplings would function substantially as described. Further, it will be understood that other variations and modifications can be made to the disclosed embodiment of the invention without departing from the spirit and scope of the invention as set forth in the following claims.

I claim:

1. A multiple duct conduit system for fiber optic cable and the like comprising:

a plurality of conduit sections connected end-to-end with each conduit section including an outer duct and a plurality of inner ducts extending lengthwise within the outer duct and with the inner ducts protruding from one end of the outer duct a predetermined substantially uniform distance in accordance with the temperatures of aid outer duct and said inner ducts;

said outer duct being fabricated of a material having a different coefficient of expansion than the material of said inner ducts;

couplings joining the adjacent ends of the conduit sections, each coupling including end portions telescopically received in the adjacent ends of said outer ducts and an outwardly extending flange means intermediate its end portions for engagement by the adjacent ends of adjacent outer ducts for holding said coupling in place, said couplings defining passageways extending therethrough with one end of each passageway joined to the end of an inner duct and the other end of each passageway telescopically receiving the protruding end of an inner duct, an annular seal formed about each passageway for sealing against the outer surface o the protruding end of an inner duct, and an abutment means positioned in each passageway offset from said outwardly extending annular flange along the length of said coupling to form an expansion chamber in each passageway for its inner duct between the annular seal and the abutments means of a length at least twice the length of the protruding ends of the inner ducts when the conduit section is at a temperature of approximately 55 degrees F. so that the inner ducts can freely expand and contract with respect to their outer ducts so as to move further into or withdraw partially out of their expansion chambers without breaking the seals between the inner ducts and said coupling.

2. The multiple duct conduit system of claim 1 and wherein said inner ducts are fabricated of polyethylene.

3. The multiple duct conduit system of claim 1 and wherein said inner ducts are fabricated of polyethylene and said outer ducts are fabricated of polyvinylchloride and wherein said expansion chambers are of a length greater than the relative expansion of said inner ducts with respect to the outer ducts in a temperature range extending at least about 40° F. higher than and about 40° F. lower than normal ground temperature of about 55° F.

4. The multiple duct conduit system of claim 1 and wherein said outer ducts each includes a main body portion and an enlarged end portion having an annular shoulder connecting the enlarged end portion to the main body portion, said outwardly extending annular flange means of said couplings formed of an outer diameter approximately equal to the outer diameter of the main body portion of said outer ducts, said outwardly extending annular flange means positioned between the annular shoulder of one outer duct and the end of an adjacent outer duct.

5. A multiple duct conduit system for fiber optic cables or the like comprising:

a plurality of conduit sections mounted end-to-end with each conduit section comprising an elongated open-ended outer duct of a first material and a plurality of elongated open-ended ducts of a second material disposed in and extending along the length of said outer duct;

said first and second materials having different coefficients of thermal expansion;

said outer duct comprising an elongated main body portion of uniform width and an enlarged end portion at a second end of said main body portion of a size sufficient to telescopically receive the end of the main body portion of an adjacent outer duct;

said inner ducts each having protruding end portions extending outwardly from the first end of their outer duct a predetermined distance at a given temperature;

a coupling having opposed end portions sized and shaped to be telescopically received in the main body portions of adjacent outer ducts with a protrusion extending outwardly from an intermediate portion of said coupling for engagement between the main body portions of adjacent outer ducts;

passageways extending through said coupling, abutment means positioned in each passageway of said coupling and with one end of each passageway permanently connected to an inner duct at the second end of its outer ducts with the inner duct juxtaposed said abutment means, and the other end of each passageway slidably receiving the protruding end of an inner duct of an adjacent conduit section, with seal means in each passageway spaced from said abutment means for sealing against the outer surface of the protruding end of the inner duct extending into its passageway; and the portions of at least some of said passageways located between said abutment means and said seal means comprising an axial expansion chamber of a length longer than the protruding end portions of said inner ducts at temperatures of at least about 40° F. higher than or about 40° F. lower than ground temperature of about 55° F.

6. A multiple duct conduit system as defined in claim 5 in which said axial expansion chambers are at least twice the length of said protruding end portions of said inner ducts when said conduit sections are at approximately 55° F.

7. A multiple duct conduit system as defined in claim 5 and wherein said inner ducts are fabricated of polyethylene and said outer ducts are fabricated of polyvinylchloride.

8. A multiple duct conduit system as defined in claim 5 in which said second material of said inner ducts has a rate of expansion which is approximately 0.22 inches per ten degrees of temperature change different than the rate of expansion of the material of said outer ducts for a twenty feet of length of outer duct.

9. A coupling for a multiple duct conduit system, said system having a plurality of outer ducts in end-to-end relationship with respect to one another and a plurality of inner ducts disposed within each of aid outer ducts and protruding from one end of said outer ducts, said inner ducts having a coefficient of thermal expansion which is greater than that of said outer ducts, said coupling comprising an elastomeric member having parallel passageways therethrough for receiving each inner duct, the exterior surface of said coupling being of a generally cylindrical outside shape and sized to be telescopically received within and close said outer ducts at the junctions of said outer ducts for retaining and sealing said outer ducts in end-to-end relationship, said coupling including outwardly extending flange means intermediate its ends for engagement by the adjacent end portions of said outer ducts for holding said coupling in place, the passageways of said couplings being sized to telescopically receive adjacent end portions of said inner ducts and each passageway including therein an abutment means offset along the length of said coupling from said outwardly extending flange means and a sealing means defining an expansion chamber in said passageway for accommodating changes in the length of the inner duct received therein with respect to said outer duct while maintaining the sealed relationship thereof, said expansion chambers being at least approximately twice as long as the protruding ends of said inner ducts when the conduit sections are at ground temperature.

10. A coupling as defined in claim 9 in which said abutment means provides a set for one end of each of said inner ducts and the protruding ends of aid inner ducts are disposed in said expansion chambers of the adjacent coupling.

11. A coupling as defined in claim 9 and further including an outer circumferential surface with sealing means disposed therearound for engaging the inner wall of said outer ducts.

12. A coupling as defined in claim 9 and further including a centrally positioned passage parallel to said passageways of a breadth suitable for receiving a foamed adhesive therethrough so that foamed adhesive can e injected through said passage to adhere to the facing surfaces of the inner ducts, outer duct and coupling.

13. A conduit section for use in end-to-end relationship with other similar conduit sections comprising:
an outer duct including a rectilinear main body portion and an enlarged end portion at a first end of said main body portion of a size that telescopically receives the second end of the main body portion of an adjustment one of the conduits, said enlarged end portion being rigidly joined to the first end of said main body portion by an annular shoulder,
a plurality of rectilinear inner ducts positioned within and extending along the length of said outer duct, with one end of each inner duct protruding from the second end of the main body portion of said outer duct,
a coupling mounted in the enlarged end portion of said outer duct, said coupling having a substantially cylindrical outer surface of a size to be telescopically received through the enlarged end portion and into the first end of the main body portion, and an annular flange extending thereabout between the ends thereof for engaging said annular shoulder for maintaining one end portion of said coupling in the first end of said main body portion and the other end portion of said coupling in the enlarged end portion of said outer duct, with the exposed end face of said coupling generally coextensive with the end of said enlarged end portion,
said coupling defining passageways therethrough with the interior end of each passageway telescopically receiving the other end of an inner duct and the exterior end arranged to telescopically receive the protruding end of an inner duct of an adjacent conduit section, said passageways of said coupling including abutment means positioned in the inner end of each passage for abutment by the inner end of an inner duct, seal means in the exterior end of each passageway, said abutment means and said seal means defining an expansion chamber for permitting longitudinal movement therein of the protruding ends of an inner duct of an adjacent conduit section in response to expansion or contraction of the inner ducts with respect to the outer duct.

* * * * *